United States Patent [19]
Clapp

[11] Patent Number: 5,296,890
[45] Date of Patent: Mar. 22, 1994

[54] LIGHT SOURCE FOR PHOTOGRAPHIC COLOR PRINTERS

[76] Inventor: Roy A. Clapp, 2505 S. Kiwanis Ave., Apt. 352, Sioux Falls, S. Dak. 57105

[21] Appl. No.: 888,920

[22] Filed: May 26, 1992

Related U.S. Application Data

[63] Continuation of Ser. No. 763,318, Sep. 20, 1991, abandoned.

[51] Int. Cl.$^5$ .................... G03B 27/54; G03B 27/72
[52] U.S. Cl. .......................... 355/37; 355/35; 355/38; 355/36; 355/70; 355/71
[58] Field of Search ............ 355/35, 38, 37, 32, 355/36, 70, 71

[56] References Cited

U.S. PATENT DOCUMENTS

| | | | |
|---|---|---|---|
| 3,488,117 | 1/1970 | Weisglass | 355/35 |
| 3,492,070 | 1/1970 | Zahn | 355/35 |
| 3,630,609 | 12/1971 | Clapp et al. | 355/37 |
| 3,684,371 | 8/1972 | Weisglass et al. | 355/37 |
| 3,873,199 | 3/1975 | Weinert | 355/38 |
| 4,087,176 | 5/1978 | Nigg | 355/35 |
| 4,143,966 | 3/1979 | Gandini | 355/35 |

Primary Examiner—Monroe H. Hayes

[57] ABSTRACT

A light source for use in exposing photographic material through a negative. The source includes a plurality of lamps, one appropriate to each emulsion layer of the material to be exposed. Each lamp has a reflector projecting a light stream through a dichroic filter which limits the energy of the stream so that it acts on a single layer. The separate streams are then combined into a single stream which is further treated to eliminate rays exceeding a predetermined angle. Cut off blades may be used to terminate the projection of any one or more of the individual streams for certain definite times depending on the desired exposure of each separate emulsion layer.

13 Claims, 4 Drawing Sheets

LIGHT SOURCE FOR PHOTOGRAPHIC COLOR PRINTERS

This application is a continuation in part of may earlier application; Ser. No. 07/763,318 filed Sep. 20, 1991, and now abandoned.

BACKGROUND OF THE INVENTION

While it is possible to make passable color prints using the full visible spectrum for printing illumination, higher color saturation and contrast is secured if the printing light is limited to certain narrow bands of red, green and blue regions of the spectrum corresponding to the three regions where the sensitized material has its peak sensitivity and the dyes forming the negative image have their maximum density.

Eastman Kodak, in their manual "Kodak Filters for Scientific and Technical Uses" (First Edition, page 35) designate filters suitable for printing color negatives. They name their Wratten filters numbered 70, 99, and 98 to isolate narrow bands within the red, green and blue light components respectively. These are absorption type filters which perform the same in any of light stream, convergent, divergent, collimated, or any combination of these.

The red filter, number 70, is quite satisfactory, cutting off the unwanted energy sharply, while offering little obstruction to the desired energy band. This is not true for the other two filters. They also remove the unwanted wavelengths, but at the expense of absorbing a major share of the useful light. The blue filter, number 98, passes only 40% of the incident energy at its highest transmission point of 430 nanometers wavelength. The green filter, number 99, passes only 19.9% of the incident green light at 550 nanometers wavelength, its highest transmission point. Such losses cannot be tolerated in competitive commercial photo printing. Instead, the industry turned to dichroic filters and "white light subtractive printing".

A dichroic filter operates by transmitting light of one portion of the spectrum, while reflecting the rest of the spectrum. Employed as a filter the reflected portion is discarded. The fact that such filters divide the spectrum into two complimentary parts makes them extremely useful as beam splitters or as synthesizers for combining different colored light streams.

These filters are highly effective if their unique limitation can be accommodated. The spectral content of the transmitted and reflected components will vary from its designed value if the light stream is not collimated and incident to the filter at its designed angle (usually normal).

When precise control of transmission is needed a collimator has been required, but these cannot provide nearly enough illumination to compete with light sources in present use.

Consequently, the industry has almost universally adopted the full spectrum as emitted by high wattage incandescent lamps for a printing illumination.

It is the major object of this invention to provide a source of narrow band printing illumination, free of filter crossover, which combined with the optical system of my earlier patent can serve in high production printers.

To describe the term "narrow band" as used herein refer to FIG. 11, a graph of sensitivity vb wavelength. It will be seen that each emulsion has much higher sensitivity to a specific band of wavelength, but no emulsion is insensitive to other colors. There is a region of overlap. Narrow band printing uses illumination which is devoid of the wavelengths which would produce exposure in the overlap sections. To accomplish this, filters must be designed to transmit wavelengths narrower than the usual stock red, green, and blue dichroic filters, moreover the light used with these filters must be collimated within a certain tolerance.

Obviously exposure by white light exposes these overlap regions along with all the rest of the spectrum. Nor do commercial additive lamphouses do better by merging red, green and blue light beams. Not only are the individual dichroic filters designed to pass the full spectral band of these colors, these filters are used without collimated light.

This invention removes the wavelengths corresponding to regions of overlap. So exposures are absolutely confined to the proper emulsion.

PRIOR ART

The most common light source in wide use for multi-image printers is illustrated schematically in FIG. 1. It utilizes the principal that in a ellipsoidal reflector all rays radiated from a light source located at one focal point are directed to the second focal point. The housing 10 with its specular inner surface 13, encloses a 1000 watt lamp 11. This housing ends at the geometric center of the ellipsoid, where a dichroic "cold mirror" 14 closes the opening. This mirror reflects the front half so that it behaves as if it were a complete ellipsoid as indicated by the dashed outline 15. This results in collecting practically 100% of the light flux from the lamp and projecting both the reflected and the direct rays as a divergent stream through the outlet opening 12. This light stream contains the full visible spectrum, so it acts on all the sensitized emulsion layers simultaneously. Three cutoff filters 29 are positioned adjacent to the opening, so they can be individually inserted into the emerging light stream as a control means. These filters are intended to remove by reflection any one of the red, green, or blue printing components when each sensitized emulsion layer is correctly exposed. Whereas, what really happens in the diverging light stream, only part of the rays of the designed color are blocked, resulting in reducing the rate of exposure instead of stopping it. Other rays incident to the dichroic filter take on a different color which can adversely affect a different emulsion layer. This effect is known as filter cross-over.

Another prior art lamphouse is described by Zahn, in his U.S. Pat. No. 3,492,070. This patent discloses the use of opaque cutoff blades as a control means. However examination of his patent drawings and description reveal that he locates his filters either between the lamps and the light guides, where the rays are clearly convergent, or in a diffused light stream. These conditions preclude getting a satisfactory narrow band performance with a dichroic filter, and the use of absorption type would render the device too slow to be competitive. In all fairness he makes no claim for narrow band illumination.

To avoid confusion about a component which is an important part of this invention, attention is directed to U.S. Pat. No. 3,988,117 of Weinglass which incorporates an internally reflective cone. In this patent this component has the sole functions of constricting a single raw light stream in order to minimize the size of the inlet port to an integrating chamber, thereby limiting light loss by reverse reflection, and to simplify interchanging different sized chambers. It will be seen that a similar component is used in the present invention to perform several entirely different important functions. In fact, while this invention can be used with an integrating chamber, said chamber is not an inherent part of this invention, in fact the preferred embodiment does not involve a chamber at all.

OBJECTS AND ADVANTAGES

The object of this invention is provide a light source which will yield color prints superior in contrast and color saturation to those produced by white light printing.

The light source was developed especially to work in combination with my high-efficiency illuminating system, described in U.S. Pat. No. 4,896,187 to provide a lamphouse which delivers the foregoing benefits while maintaining short exposure times.

It provides a lamphouse that can be operated by the existing exposure controls of present printers, providing a lamphouse adapted to retrofit and upgrade existing printers.

It provides the higher red energy component required for color balance of color print material.

It yields these advantages with greatly reduced wattage lamps. This reduces the heat generated, which is not confined and concentrated. The three separate lamps can be easily cooled by a quiet axial flow fan, instead of requiring a powerful blower which requires vibration isolation.

Importantly, altering the voltage to the lamps does not produce shifts in the individual spectrum due to changes in color temperature of the lamps. The narrow band filters continue to pass only their designed band, and simply change light intensity.

The light source used herewith has a higher efficiency than the structure of FIG. 1, since only a single reflection produces an approximate collimated beam which contains 80% of the light flux emitted by the lamp filament instead of having all of the energy radiated as a divergent fan. It uses a commercial lamp instead of requiring the elaborate fabricated structure of FIG. 1.

This invention eliminates the problem of makeovers caused by filter crossover.

Used with opaque cutoff blades, this invention completely ends all exposure to its respective layer, resulting in better density and color balance control. This reduces the amount of rejected prints and makeovers.

DESCRIPTION OF THE INVENTION

Figure 10:
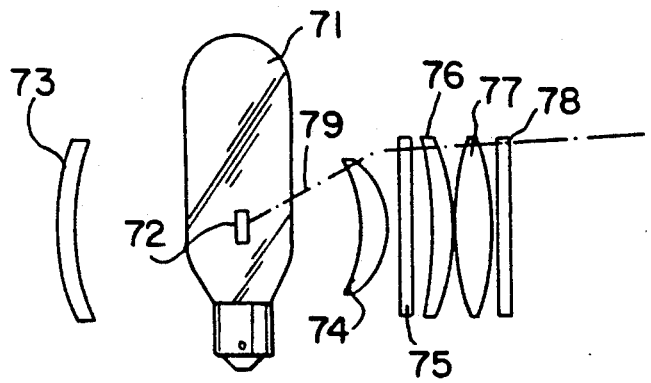
FIG. 10 is a diagram of collimator from the prior art.
Figure 11:
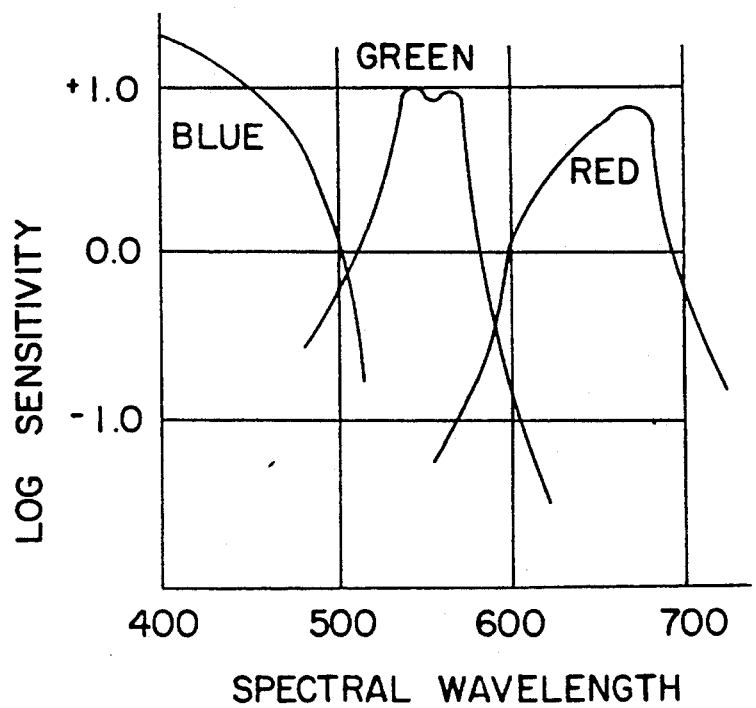
FIG. 11 is a plot of sensitivity vs. wavelength for print material.

Examining the collimator depicted in FIG. 10, the first condenser 74 can collect about a 60 degree solid angle of the light from the filament 72 of lamp 71, a small percentage of the total emitted by the lamp. A spherical mirror 73 contributes some added flux, but most of this is blocked by the lamp filament itself. A ray 79 is the boundary of a ray bundle that becomes parallel as they pass in succession through, a heat filter 75 and lenses 76 and 77. Notice that in this device the output is collimated before it passes through the dichroic filter 78, fulfilling the requirement to produce the designed spectral content.

It is important to recognize that the resultant light beam is not perfectly collimated. The lamp filament is of finite size so rays from different points on the filament take a slightly non-parallel path in the final light stream.

The present invention employs a much more efficient source of illumination, lamps having their filament mounted within a reflector which collects approximately a solid angle of 240 degrees, while also passing all the remaining direct radiation. There are a number of different types of these lamps, some that produce convergent beams, and others which have beams that are approximately parallel, such as the DDL.

Figure 2:
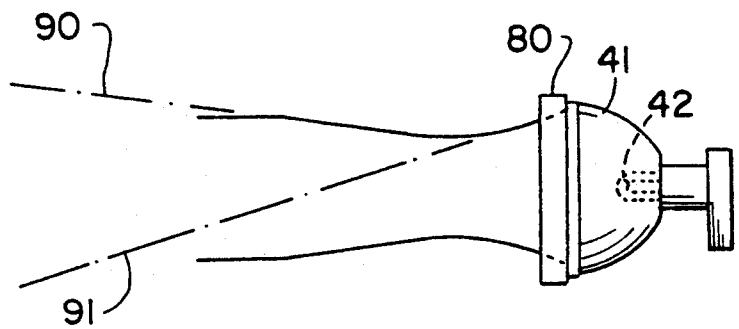
FIG. 2 is a lamp of the type adapted for use in this invention, with the envelope of its projected light stream.

FIG. 2 illustrates the outline of the beam from a commerical DDL lamp. The lamp 41 has its filament 42 contained within a reflector which collects a solid angle of about 240 degrees, projecting this light flux in a beam that is approximately collimated. About 80% of the total light from the filament is in this beam. The remainder of the light from the filament passes through the open end of the reflector in a divergent fan.

It will be seen that while the general shape of the beam is approximately parallel, if a border ray is extended as at 90, it diverges; while another, 91, is convergent, crossing the center line. The fact that these rays are not visible after they leave the beam is evidence that they represent a minor percentage of the beam itself. If this flux is examined in a smoke filled atmosphere, the outline of the beam is clearly visible having the boundary indicated by the solid lines of FIG. 2.

A dichroic filter 80 close to the lamp receives all the rays, about 80% of the light flux collimated so this percentage of the light is transmitted as the desired narrow band as defined by the filter design. The remaining 20% is contained in the divergent direct rays from the filament, the central rays of this divergent fan, up to about 6 to 8 degrees are also usable.

Figure 3:
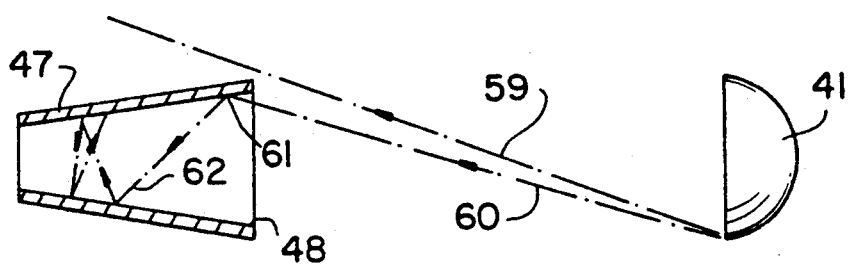
FIG. 3 is a diagrammatic view of this invention with certain rays displayed.

FIG. 3, illustrates the way the deleterious rays are removed. A lamp 41 is positioned a distance away from the entrance of an internally reflective cone 42. This entrance has about the same diameter as the mouth of the lamp. The well defined boundary of the reflected rays show that about the worst departure from parallel is ray 91 of FIG. 2. Assuming it has an angle to allow it to just enter the cone at point 61, as it makes several reflections its angle rapidly increases, so that it soon exceeds 90 degrees and eventually emerges back through the entrance opening.

Yet another ray with less initial angle would bounce several times yet eventually pass through the exit opening, but the multiple reflections would lower its energy level. While rays nearly parallel to the path of the beam would pass through the cone with no more than a single reflection.

While any ray leaving the extreme edge of the reflector at an angle greater than ray 91 of FIG. 2 misses the open end of the cone, as shown by the ray 59.

Compared to the few rays which need to be removed from the collimated beam, some of the direct rays from the filament can be as high as 60 degrees. But the highest angle allowed to pass the cone can be limited to 8 degrees, and the average about 5 degrees. These produce a shift well within acceptable limits, especially since they would be small in number, compared to the collimated beam.

Design variables, including the diameter of the cone entrance, slope angle of the walls, the length from entrance to exit, and the distance between the lamp and cone can be used to determine the limits of the ray angles that can pass through.

A cone with walls 12½ degrees from its axis, an entrance the same diameter as the lamp reflector positioned six inches away, has proven satisfactory in screening out undesirable spectral energy using a DDL lamp. In addition to its screening function this cone serves two additional functions, it mixes and blends the three colored light streams to make the emerging printing light more uniform, and it changes the newly collimated beam into a divergent light stream.

Incidentally, the cone need not be round, but can have a rectangular cross section.

THE COMPLETE EMBODIMENT

Figure 4:
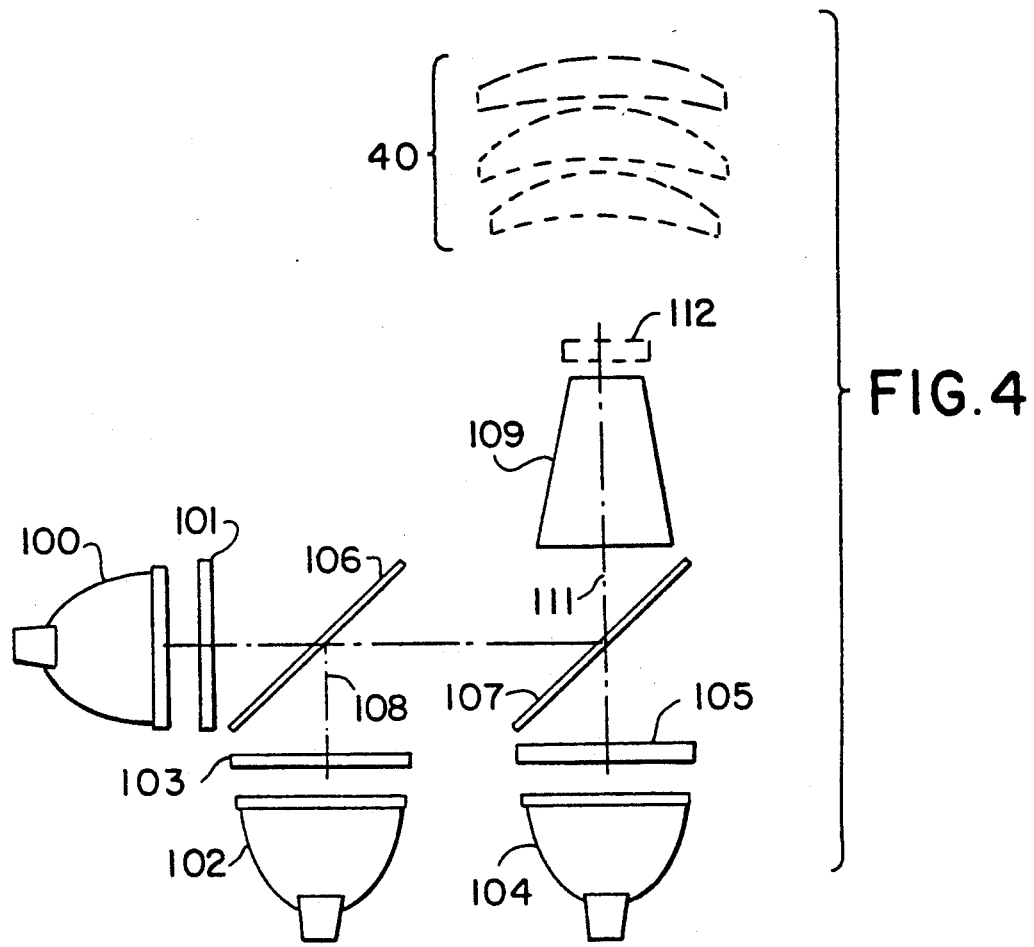
FIG. 4 is a schematic layout in elevation of one embodiment of this invention.

This principal can be applied in different ways. FIG. 4 is a simple example. Three lamps, 100, 102, and 104 provide three independent light streams, a dichroic filter 101 is designed to transmit a narrow spectral band of green light along the path 107, passing freely through the dichroic blue reflecting component 106.

Lamp 102 has the filter 103 designed to transmit the blue spectral band. This light is projected along path 108 to component 106 where it is reflected to merge with the green light forming a cyan stream directed to component 109, which reflects the cyan beam to the screening cone, thus allowing the collimated rays to pass through, while the high angled deleterious rays are removed as just described.

To obtain a higher output of the red light flux, the lamp 104 is placed much closer to the screening cone. Instead of a dichroic filter a glass absorption filter 105 with transfusion similar to a Wratten number 70 is employed. This filter is not affected by the angle of incidence, so that there is no shift in spectral transmission from the non-collimated rays. This red light is freely passed by component 107 to merge with other two beams along path 111.

Figure 1:
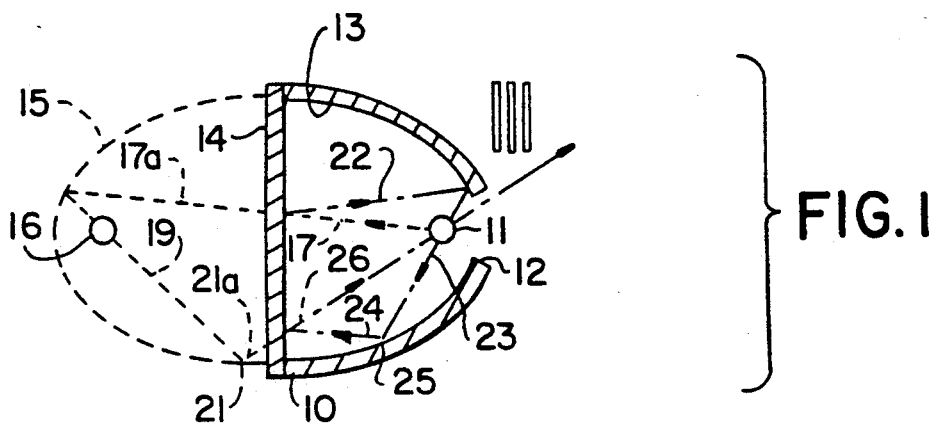
FIG. 1 is a schematic diagram of a prior art color printing light source.

This mixture of energy constitutes the desired printing light which is mixed in the cone and emerges as a concentrated somewhat divergent stream, which is smaller then the negative to be printed. A diffuser 112 may be employed to improve the even distribution. This light source is ideal to be utilized with the optical magnifying system 40, as described in my prior patent, U.S. Pat. No. 4,896,187 which allows the exposure time of the lower wattage employed with this invention to be competitive to the much heavier powered lamphouse of FIG. 1.

OTHER VARIATIONS

Figure 7:
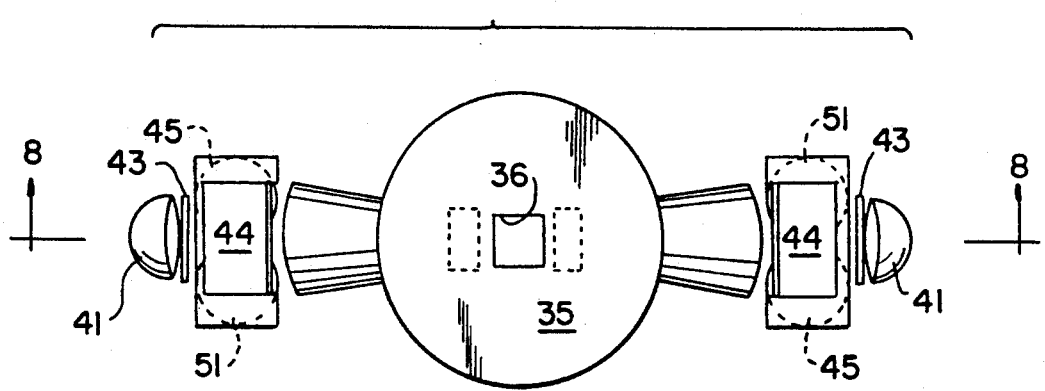
FIG. 7 is a schematic plan view of one means for combining the output of two units of this embodiment.
Figure 8:
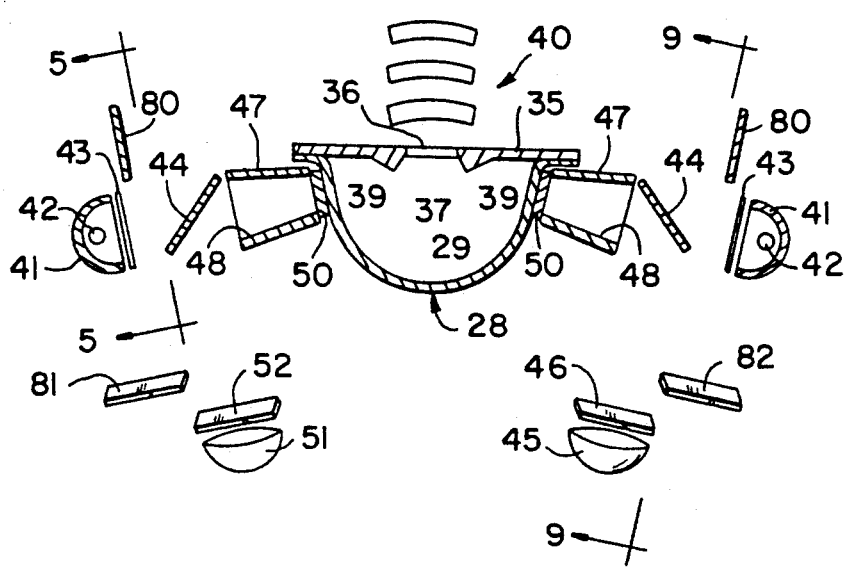
FIG. 8 is a schematic section taken as indicated from line 8—8 in FIG. 7.
Figure 9:
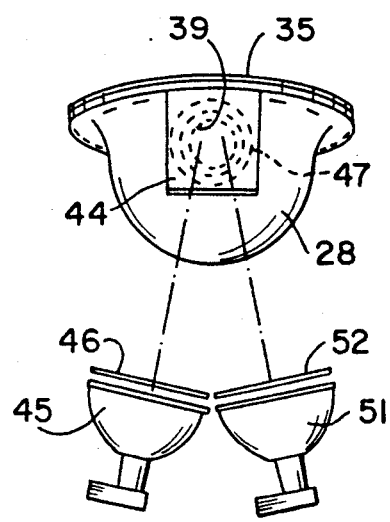
FIG. 9 is a schematic side view taken as indicated from line 9—9 in FIG. 8.

FIGS. 7, 8, and 9 show a method of combining two units of this invention to obtain a higher light output, if desired.

In the example just presented, the individual beams were merged to form the printing light stream by using dichroic components 106 and 107. However, in FIGS. 7, 8, and 9, the two dichroic filtered light beams are combined by simply directing them to be superimposed at the entrance to the cone. Seen in FIG. 9 especially, lamps 45 and 51 are positioned to have their beams converge, these beams are intercepted by dichroic component 44 where they merge with red light and together are united at the entrance to the cone.

In FIGS. 7, 8, and 9 an integrating chamber 28 is in the form of a hemisphere has two input ports 39-30. The top of the chamber 35 has a light emission opening 36. This serves as the secondary light source of my patent U.S. Pat. No. 4,896,187 for the optical magnifying system indicated schematically 40.

Two units of this invention feed their output to the ports 39—39 through diffusers 50—50. A side elevation FIG. 9 shows each of the two lamps 45 has a green dichroic filter, and each lamp 51 has a blue transmitting filter. These are located at sufficient distance from the entrance to the cone to eliminate the ray which exceed the predetermined angle of deviation from the beam path. A lamp 41 with a red transmitting filter of the absorbing type projects its light flux through the dichroic component 44 to merge with the other two spectral bands, forming the printing light stream, to discharge through the emission opening 36.

So far these examples have been described as they are configured for "additive printing". The method adjusts the light intensity of the three colors of light flux to obtain the desired color balance for a specific negative. The duration of the exposure can be the same for all negatives, or can be varied to provide a separate control of density.

This invention now delivers a special advantage to this system of printing. Whereas, with the lamphouses used heretofore, when the voltage to the lamps was changed, it not only changed the light output, it caused a change in color temperature, that is a spectral shift which affected contrast and color saturation. With this invention the spectral color transmission remains within the limits set by the dichroic filter design, and only light intensity changes.

"SUBTRACTIVE PRINTING"

Most professional printers operate with the subtractive printing system. This invention can be easily configured for this system simply by adding automated cutoff blades as shown schematically in FIG. 8, indicated at 60, 81, and 82. These are inserted into the individual light stream, serving to completely cut off all further exposure of the sensitized layer which was being exposed by the particular color beam acted upon. This is quite unlike the dichroic cutoff means of FIG. 1, which when inserted in the single light stream simply slows down further exposure of its corresponding layer, while at the same time adversely affecting the exposing of the other layers because of filter crossover.

The opaque cutoff blades employed in this invention completely stop the exposure of its sensitized layer. That action has no effect upon the other emulsions because the region of overlap is not receiving energy.

Figure 5:
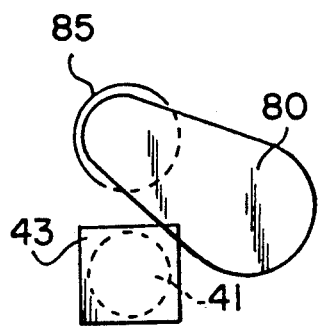
FIG. 5 is a front view of a cutoff blade subassembly.
Figure 6:
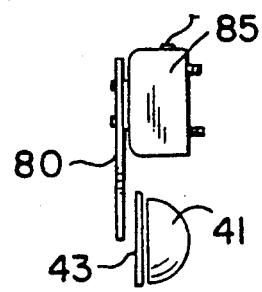
FIG. 6 is a side view of the same subassembly.

The preferred form of these cutoff assemblies is shown in FIGS. 5 and 6, in which a lamp 41 with a filter 43 has a rotary solenoid 85 mounted adjacent, with a cutoff blade 80 normally just clear of the light beam. These solenoids are identical to the ones used with the lamphouse of FIG. 1, consequently in retrofitting a printer with this light source, it is only required to disconnect the wires from the unit being removed and connecting the wires to the new unit.

The thin metal opaque blades have lower mass so they can be moved faster. Moreover, the thin glass dichroic cutoff filters are delicate and frequently shatter, requiring costly replacement. This expense is eliminated with this invention.

I claim as my invention:

1. For use with apparatus for exposing color photographic material through a negative, said material having a plurality of emulsion layers, a light source device having a plurality of lamps, one for each emulsion layer, each lamp having an integral reflector with a solid collection angle greater than 180 degrees designed to project a light stream composed of substantially parallel rays, said parallel rays being combined with the direct divergent fan of rays emitted by the lamp filament to form composite light streams, a dichroic filter positioned in the path of each of said composite light streams, each dichroic filter being adapted to limit the spectral energy of the parallel rays to act exclusively on a single emulsion layer, means to combine these composite light streams into a single light stream, means to remove from this combined light stream rays that exceed a predetermined angle, and to form a printing light stream.

2. The light source device of claim 1, in which the means to remove undesired divergent rays includes a first aperture and a second aperture spaced apart, said first aperture being the mouth of the lamp reflector, said second aperture being the entry for said stream into said means to combine the light streams.

3. The light source device of claim 1, in which the means to remove the undesired divergent rays exceeding a predetermined angle includes a conic member with internally reflecting walls, said conic member being positioned at a distance from said lamp filaments to the entry and passage of rays having greater than a predetermined angle.

4. The light source device of claim 3, in which said conic member is adapted by the proportions of diameter of entrance aperture, length, and angle of walls to reject by multiple internal reflection any ray exceeding a desired angular limit.

5. The light source device of claim 1 in which an opaque cutoff blade is removably inserted in each said composite light streams, thus serving to completely terminate the exposure to a particular emulsion layer, without affecting the remaining layers.

6. The light source device of claim 1, in which the size of the printing light stream is smaller than the negative to be printed, and magnifying means adapted to magnify the printing light stream to cover the negative, so that the light from the printing stream is directed toward said color material.

7. The light source device of claim 4, in which the exit aperture of said conic member provides an emission opening smaller than the negative to be printed, and means adjacent to said exit aperture to magnify the printing light stream to cover the negative, so that the light from the magnifying means is directed to said color material.

8. For use with apparatus for exposing color photographic material through a negative, said material having a plurality of emulsion layers, a light source device having a plurality of lamps, one for each emulsion layer, at least one having an integral reflector with a solid collection angle greater than 180 degrees designed to project a substantially collimated light stream, said light stream combined with the divergent fan of rays emitted by the lamp filament forming a composite light stream, a dichroic filter positioned normal to the collimated light component, said dichroic filter designed to limit the spectral energy of parallel rays to act exclusively on a single emulsion layer, means to remove from this light stream rays that exceed a predetermined angle from this composite light stream; at least one other lamp having an integral reflector providing a composite light stream, employing an absorption type filter to limit the spectral energy to act exclusively on another emulsion layer, and means to combine these composite light streams into a single light stream to form a printing light stream.

9. The light source device of claim 8, in which the means to remove the rays which exceed a predetermined angle is an internally reflecting conic member.

10. The light source device of claim 9, in which the blue and green sensitive emulsion layers are exposed by dichroic filtered light streams, and the red sensitive emulsion layer is exposed by an absorption filtered light stream.

11. The light source device of claim 10, in which the red filtered lamp is closer to said conic member, than the dichroic filtered lamps.

12. The light source device of claim 8, in which the exit opening of the conic member is smaller than the negative to be printed, magnifying means positioned adjacent to said opening to magnify the light stream to cover the negative, so the light from the magnifying means is directed onto said color material.

13. The light source device of claim 12, in which individual opaque cutoff blades are movable into and out of each individual collimated light stream to completely terminate the exposure of their individual emulsion layers as their requirements are met, without affecting the adjacent layers.

* * * * *